United States Patent
Thornton

[11] Patent Number: 6,082,656
[45] Date of Patent: Jul. 4, 2000

[54] ELECTRONIC DEVICE WITH RETRACTABLE CORD

[75] Inventor: Curtis W. Thornton, Cary, N.C.

[73] Assignee: Ericsson, Inc., Research Triangle Park, N.C.

[21] Appl. No.: 09/240,156

[22] Filed: Jan. 29, 1999

[51] Int. Cl.[7] .................................................. B65H 75/48
[52] U.S. Cl. ...................................... 242/385.4; 191/12.4
[58] Field of Search ................................. 242/385.4, 385, 242/385.2, 385.3; 191/12.2 R, 12.2 A, 12.4; 379/441, 446, 438

[56] References Cited

U.S. PATENT DOCUMENTS

| | | | |
|---|---|---|---|
| 2,428,446 | 10/1947 | Beede | 242/385.4 |
| 2,526,256 | 10/1950 | Mihara | 242/385.4 |
| 3,695,546 | 10/1972 | Takada | 242/385.4 |
| 4,114,736 | 9/1978 | Scherenberg | 242/385.4 |
| 5,339,461 | 8/1994 | Luplow | 242/385 |
| 5,819,893 | 10/1998 | Wagner et al. | 191/12.4 |

*Primary Examiner*—John M. Jillions
*Attorney, Agent, or Firm*—Coats & Bennett, P.L.L.C.

[57] ABSTRACT

A cord retraction assembly for an electronic device includes a reel for winding and retracting the cord, a catch element adapted to engage the reel to prevent retraction of the cord, and an interlock for disabling the catch element when the cord is wound unto the reel. The catch element is urged into engagement with the reel by a spring to prevent retraction of the cord during use. A release button disengages the catch element from the reel, allowing the cord to retract. The interlock comprises a pivotally-mounted arm that rides over the cord as the cord accumulates on the reel. The accumulation of the cord on the reel pushes the arm outward into engagement with the catch element so as to prevent the catch element from moving back to the engaged position. As the cord is unwound from the reel, the catch element is able to return to the engaged position.

18 Claims, 7 Drawing Sheets

ELECTRONIC DEVICE WITH RETRACTABLE CORD

FIELD OF THE INVENTION

The present invention relates generally to cord management devices for consumer electronic devices and, more particularly, to a retractable cord reel for a consumer electronics device having a locking mechanism that disengages from the reel when the cord is wound onto the reel and automatically engages the reel when the cord is payed out.

BACKGROUND OF THE INVENTION

Portable consumer electronic devices, such as AM/FM radios, tape players, and CD players, have gained widespread acceptance and use. Typically, the electronic device includes a headset that plugs into the device and is worn by the user. The headset allows the user to engage in activities, such as w,alking or running, while listening to music. Additionally, the headset can be used to avoid disturbing other nearby persons.

In most electronic devices, the headset is connected by a cord to the electronic device. Most devices do not include any means for cord management when the headset is not in use. In such circumstances, the user will typically wrap the cord around the device or otherwise coil the cord and secure it with a rubber band or tie. These methods of securing the cord have several drawbacks. First, it is an inconvenience to the consumer to have to wrap or coil the cord and secure it for storage or transportation. If consumers fail to wrap or coil the cord, it may be damaged during transportation. Even if the cord is wrapped or coiled, there is no way to control the bend radius of the power cord. Consequently, the cord will be susceptible to fatigue and separation of the cord.

Recently, cord management features have been added to many consumer electronic devices to make them more convenient for consumers to use. For example, some new portable electronics have retractable headsets. These devices include a retractable cord reel and a cradle for the headset. When the headset is not in use, a release button on the device is pressed to retract the cord. As the cord retracts, the headset is guided into the cradle on the electronic device. The retractable headset gives consumers a convenient way to store the headset and cord when the headset is not in use.

One drawback to retractable headsets is that the release button must be held until the cord is fully retracted. If the release button is released prematurely, the locking mechanism will engage and may prevent the cord from fully retracting. If the cord does not retract fully, there may not be sufficient tension on the cord to hold the headset in its cradle.

Another drawback is that many retractable headsets require two hands—one to hold the release button down while the cord retracts, and one to position the headset in the cradle. Particularly in small electronic devices, the need to use two hands is cumbersome.

Accordingly, there is a need for retractable headset that ensures that the headset will be properly seated in its cradle and does not require two-handed operation.

SUMMARY AND OBJECTS OF THE INVENTION

The present invention relates to portable consumer electronic devices such as AM/FM radios, tape players, CD players, and cellular telephones, with retractable cords. The electronic device of the present invention includes a housing containing electronic circuitry, a headset connected by a cord to the electronic circuitry in the housing, a retraction assembly for retracting the headset cord into the housing when the headset is not in use, and a self-disabling locking mechanism that prevents the cord from retracting when the headset is in use. The headset cord is wound around a reel that forms a part of the retraction assembly. When the headset cord is payed out, a catch mechanism engages the reel to prevent retraction of the headset cord. The catch mechanism is biased to the engaged position by a catch spring. To retract the headset cord, the catch mechanism is manually disengaged and a biasing member, such as a spring, rotates the reel to automatically wind the headset cord onto the reel.

An interlock prevents the catch mechanism from engaging when the cord is wound onto the reel. The interlock includes an arm pivotally mounted to the housing. As the headset cord accumulates on the reel, the arm is pushed outward by the accumulation of the headset cord. The outward motion of the arm prevents the catch mechanism from engaging the reel. The biasing member creates tension on the headset cord to hold the headset cord in place in its cradle.

When the headset is used, the headset cord is unwound from the reel. The arm is pushed inward by the catch as the headset cord unwinds. When the headset cord is unwound approximately 30% of its full length, the catch mechanism will once again engage the reel to prevent retraction of the headset cord.

DETAILED DESCRIPTION OF THE INVENTION

Figure 1:
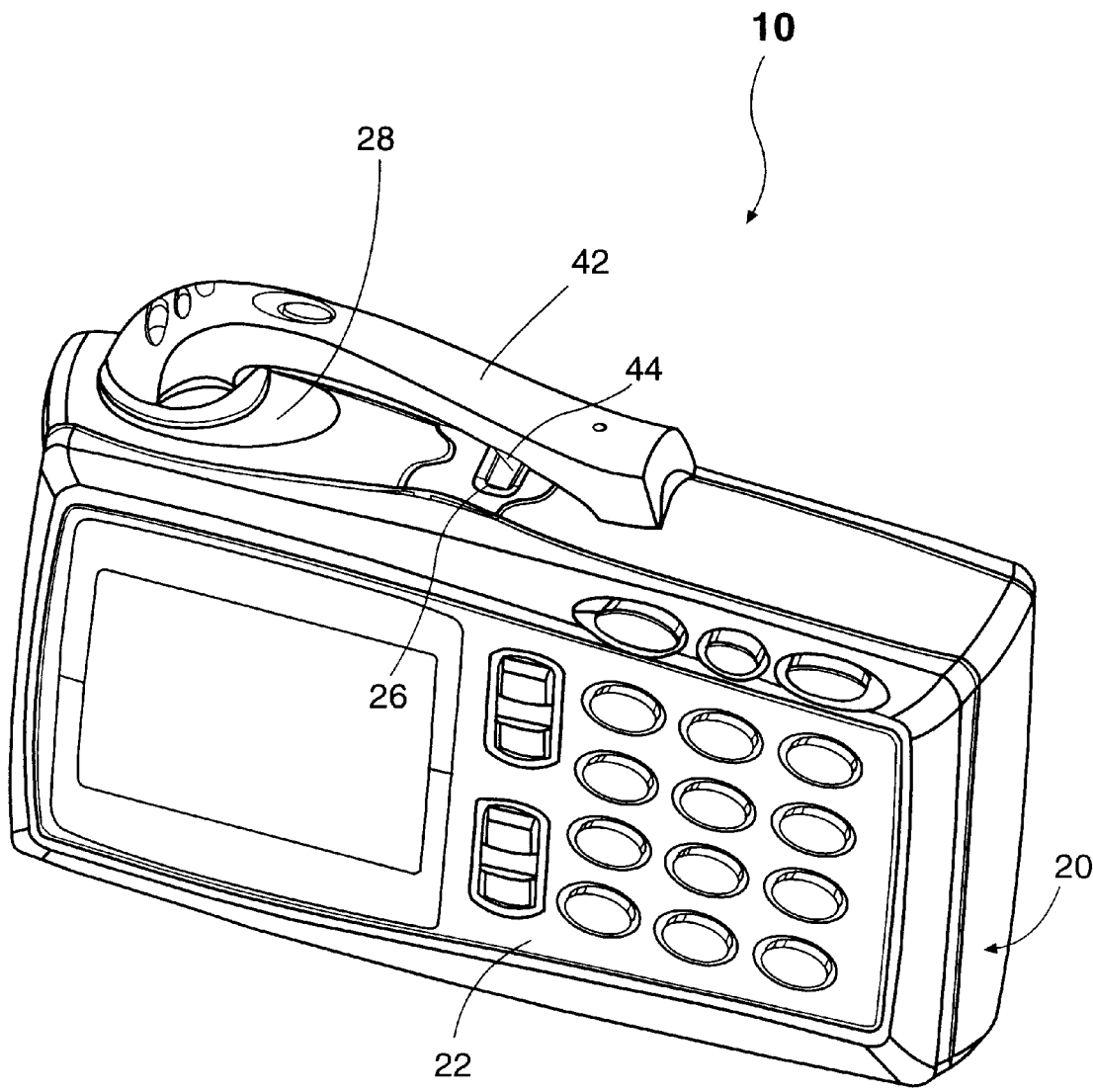
FIG. 1 is a perspective view from the front showing a portable electronic device of the present invention having a retractable headset.
Figure 2:
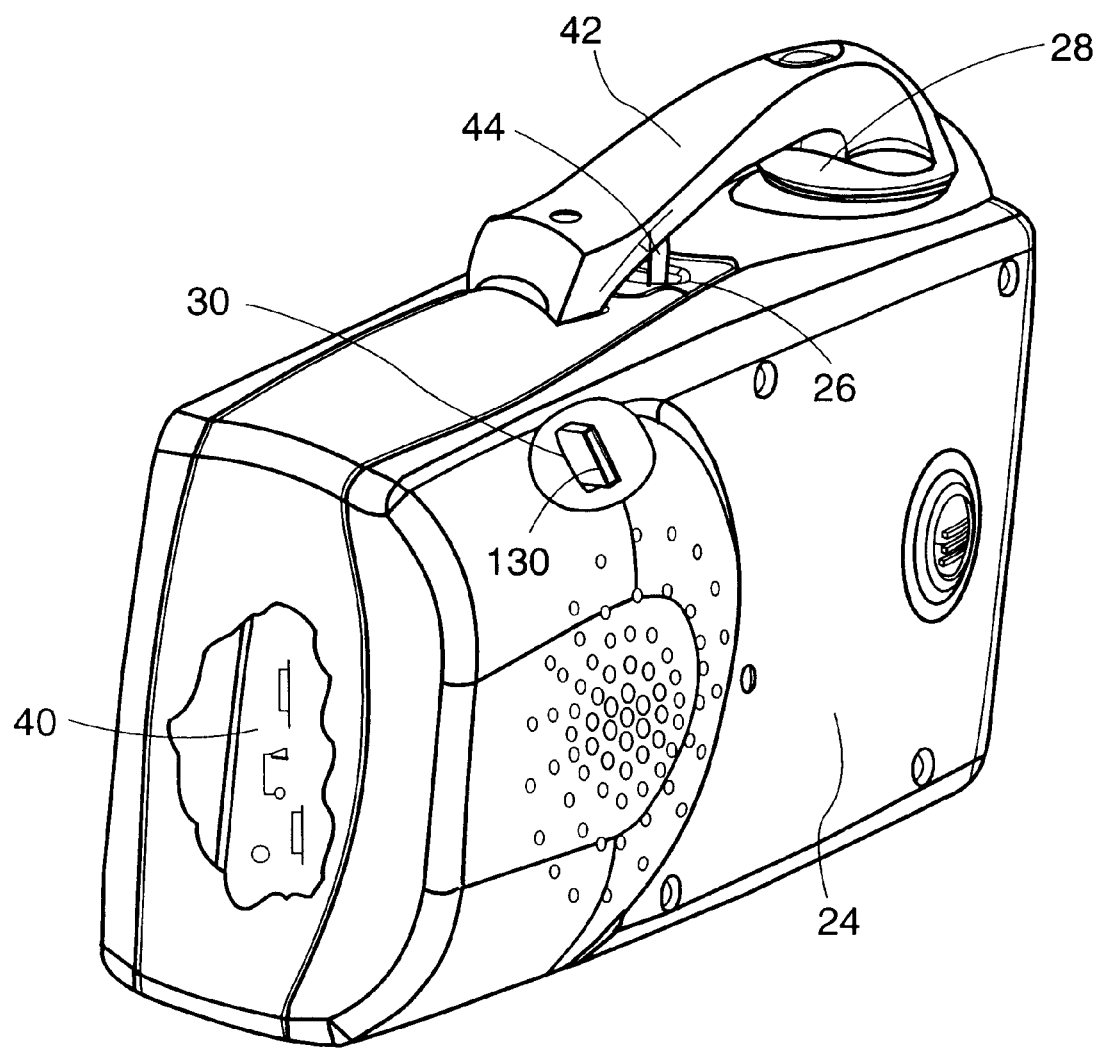
FIG. 2 is a perspective view from the rear showing the portable electronic device.

Referring now to the drawings a portable electronic device produced in accordance with the present invention is shown and indicated generally by the numeral 10. The portable electronic device generally includes a housing 20, an electronic circuit contained within the housing 20, a headset 42 connected by a headset cord 44 to the electronic circuit 40, a cord retraction assembly 50 including a winding reel 80 for retracting the headset cord 44 into the housing 20, a locking mechanism 100 for locking the winding reel 80 against rotation to prevent the headset cord 44 from retracting, a guide element 140 to guide the cord 44 as it is wound onto and off the reel 80, and an interlock assembly 160 to disable the locking mechanism 100 when the cord 44 is wound a sufficient amount onto the reel 80.

In this example, the housing 20 is a two-piece construction comprising a top portion 22 and a bottom portion 24. The top and bottom portions 22 and 24 may be joined by ultrasonic welding, adhesives, screws, snaps, or may be press-fit. A cable opening 26 is formed in the housing 20 to allow the headset cord 44 to exit the housing 20. A cradle 28 for the headset is formed on the outer surface of the housing 20 by overmolding. The purpose of the cradle 28 is to receive the headset 42 when the headset 42 is not in use. An opening 30 for a release button 130 is formed in the back portion 24 of the housing 20. The function of the release button 130 is described below.

The electronic circuit 40 is disposed within the housing 20. In the disclosed embodiment the electronic circuit 40 includes both radio circuitry and telephone circuitry. The radio circuitry and telephone circuitry are conventional and are well-known to those skilled in the art and are not essential to the understanding of the present invention. The telephone circuitry implements the IS-136 standards published by the Telecommunication Industry Association (TIA) which is incorporated herein by reference.

The headset 42 is operatively connected to the radio circuitry and telephone circuitry by a headset cord 44. The headset 42 is adapted to fit into the user's ear. In the disclosed embodiment, the headset 42 includes a microphone and speaker connected to the electronic circuits 40 in the housing 20. The headset cord 44 passes through the cord opening 26 in the housing 20. As will be explained in greater detail below, the headset cord 44 retracts into the housing 20 when the headset 42 is not in use. The headset 42 is adapted to rest in the cradle 28 on the exterior surface of the housing 20 when the headset 42 is not in use.

Figure 3:
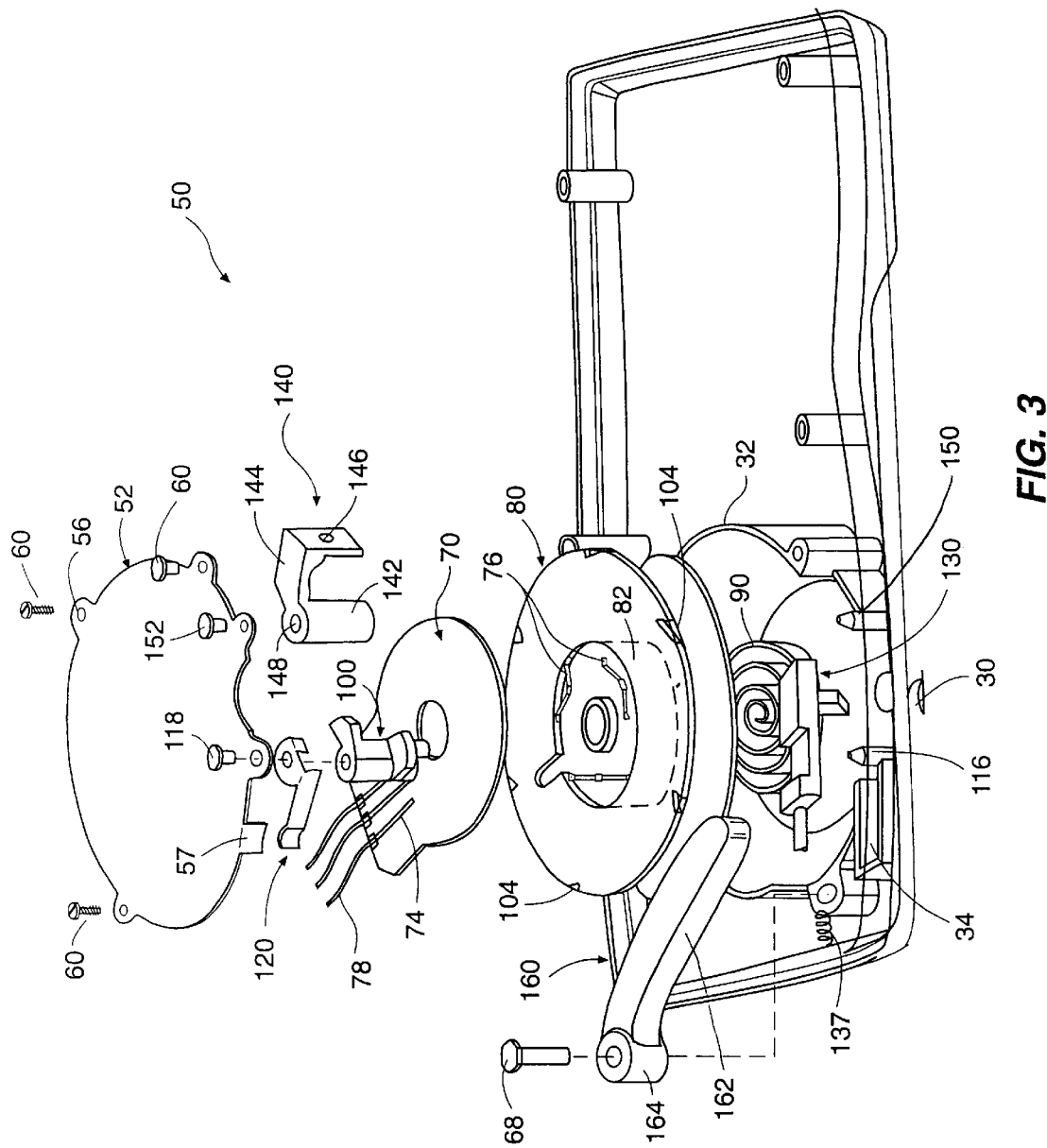
FIG. 3 is an exploded perspective view of the cord retraction assembly as seen from the top
Figure 4:
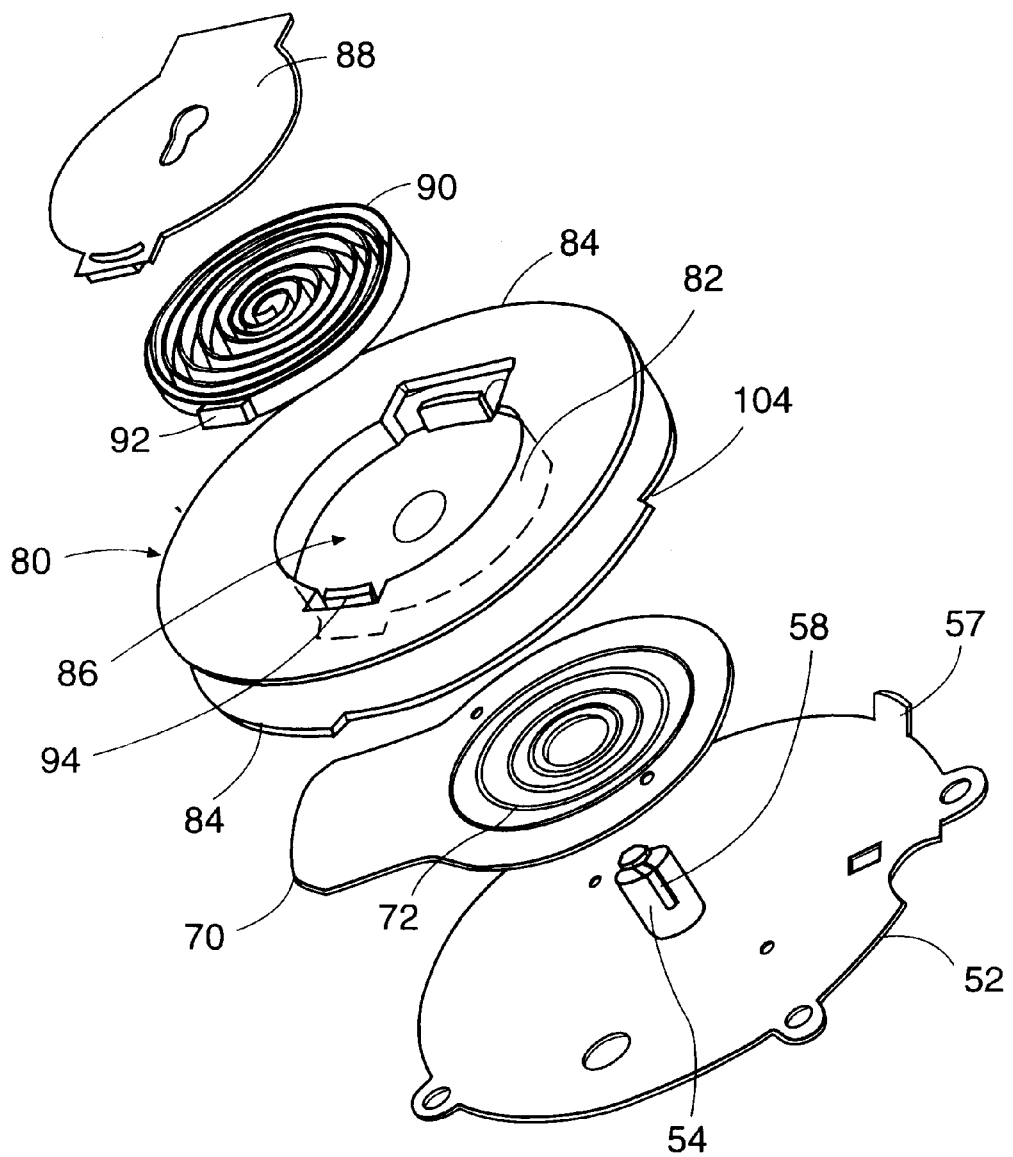
FIG. 4 is an exploded perspective view of the cord retraction assembly as seen from the bottom.

The cord retraction assembly 50, shown in FIGS. 3 and 4, is mounted to a cylindrical support structure 32 on the back portion 24 of the housing 20. The support structure 32 substantially encloses the rotating components of the cord retraction assembly 50 in addition to providing support. The cord retraction assembly 50 includes a mounting plate 52, a printed circuit board 70, a winding reel 80 on which the headset cord 44 is wound, and a biasing member 90 to rotate the winding reel 56 so as to retract the headset cord 44.

The mounting plate 52 is fastened to the support structure 32 on the back cover 22 of the housing 20. The mounting plate 52 includes a stub member 54 (FIG. 4) located generally in the center of the mounting plate 52 and a series of perimeter openings 56 spaced around the perimeter of the mounting plate 52. The stub member 52 serves as the main axle for the reel 80 and includes a slot 58, the purpose of which is explained below. The mounting plate 52 rests on the support structure 32 and is held in place by screws 60 that pass through selected perimeter openings 56 and thread into the support structure 32.

The printed circuit board 70 is secured by an adhesive to the underside of the mounting plate 52. The function of the printed circuit board 70 is to provide for electrical connection of the headset cord 44 to the electronic circuits 40. The printed circuit board 70 has a series of circular traces 72 on the surface that faces the winding reel 80 that can be clearly seen in FIG. 4. The circular traces 72 engage with contacts 76, seen in FIG. 3, carried by the winding reel 80. The contacts 76 are electrically connected to the headset cord 44. On the lower side of the printed circuit board 70 are traces 74 that extend to the perimeter of the printed circuit board 70. Traces 74 are electrically connected the circular traces 72 on the upper side of the printed circuit board 70. Lead wires 78 connect these traces to the electronic circuits 40 in the electronic device 10.

The winding reel 80 includes a central hub 82 and two flanges 84 that project outwardly from the hub 82 in spaced relation to one another. The flanges 84 define a channel for the headset cord 44. The headset cord 44 is wound on the hub 82 between the flanges 84. The hub 82 of the winding reel 80 includes a cavity 86 for the biasing member 90 which can be seen in FIG. 4.

The biasing member 90, which comprises a clock spring in the disclosed embodiment, is contained in the hub cavity 86. A cover 88 encloses the clock spring in the hub cavity 86. The inner end of the spring 90 is held in the slot 58 formed in the stub member 54. The outer end of the spring 90 is formed into a loop 92 that fits around a spring post 94 in the hub of the winding reel 80. Thus, the spring 90 is fully constrained by the winding reel 80 and stub member 54. When the headset cord 44 is pulled out of the housing 20, the winding reel 80 rotates causing the spring 90 to tighten. When the cord 44 is released, the spring 90 applies a rotational force to the winding reel 80 causing the cord 44 to retract into the housing 20.

The headset cord 44 is connected to the contacts 76 on the bottom side of the winding reel 80. The contacts 76 engage the circular traces 72 on the printed circuit board 70. As the reel 80 rotates, the contacts 76 remain engaged with the circular traces 72 to maintain continuous electrical connection with the electronic circuits of the electronic device.

Figure 5:
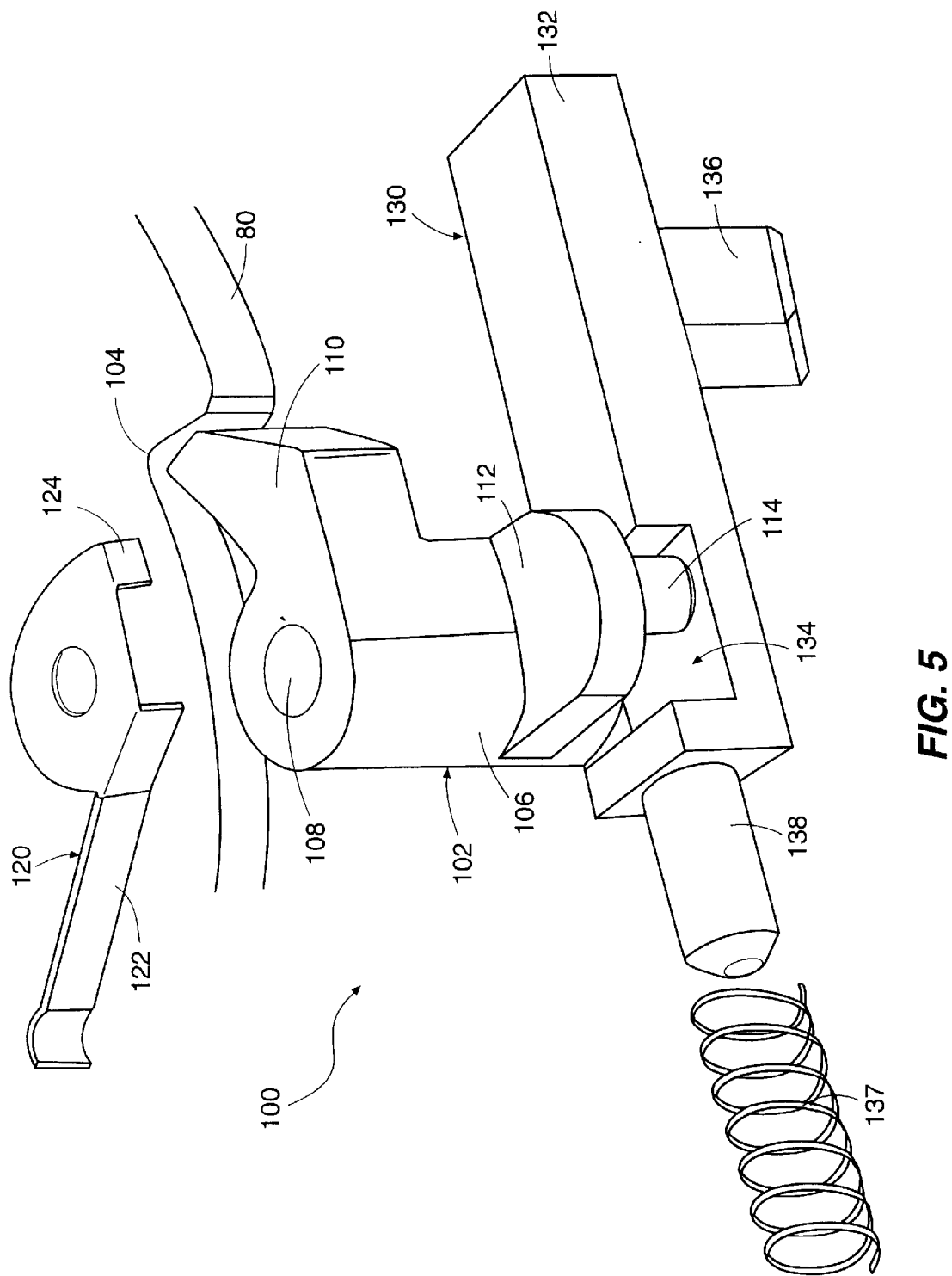
FIG. 5 is a perspective view of the catch element and release button.

A one-way locking mechanism 100 prevents the winding reel 80 from rotating when the headset 42 is in use so that the headset cord 44 will not retract. The locking mechanism 100, shown in FIG. 5 comprises a catch element 102 which engages with notches 104 on the winding reel 80, a biasing member 120 to bias the catch element 102 to an engaged position, and a release button 130 to disengage the catch element 102 from the reel to retract the headset cord 44.

The catch element 102 has a generally cylindrical main body 106 with an axial opening 108 formed therein. A pawl 110 is formed in an upper portion of the main body 106. A pivot arm 112 with a downwardly extending pin 114 is formed near the lower end of the main body 106. The catch element 102 is held in place by alignment pins 116, 118, seen in FIG. 3, that fit into respective ends of the axial opening 108. Alignment pin 116 is integrally formed with the back cover, 24 of the housing 20. Alignment pin 118 passes through opening 56 in the perimeter of the mounting plate 52 and into the upper end of the catch element 102.

Figure 6:
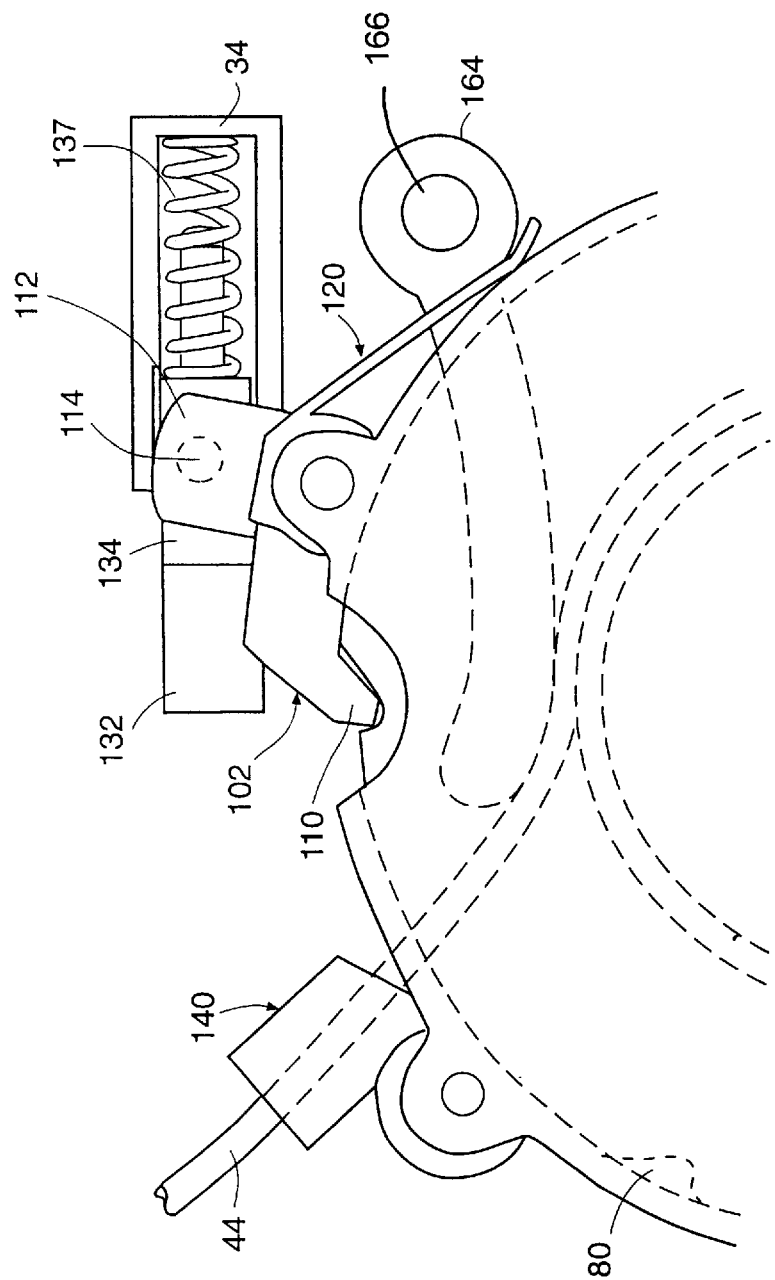
FIG. 6 is a section view of the cord retraction assembly with the cord in an unwound state.

The catch element 102 is biased to an engaged position by a cantilever spring 120. The cantilvered spring 102 includes a spring arm 122 that engages a push tab 57 on the mounting plate 52 and a spring tab 124 that engages the pawl 110 of the catch element 102. The spring arm 122 pushes against the push tab 57 on the mounting plate 52 and the spring tab 124, in turn, urges the pawl 110 of the catch element 102 to the engaged position. In the engaged position, the cord reel 80 is locked against rotation in the counterclockwise direction as seen in FIG. 6. With the catch element 102 engaged, the headset cord 44 can be payed out but cannot be retracted. In the disengaged position, the winding reel 80 is free to rotate in both directions.

The catch element 102 is disengaged from the reel 80 by the release button 130. The release button 130 comprises a slide member 132 with a notch 134 that captures the pin 114 on the pivot arm 112 of the catch element 102. The slide member 132 is received in a unshaped cavity 34 formed in the back cover 24. A thumb tab 136 projects from the bottom side of the slide member 132 through the button opening 30 in the back cover 24 of the housing 20. The slide member 132 is biased by a spring 137 to a forward position. The spring 137 fits over a spring post 138 projecting from the back end of the slide member 132. When the slide member 132 is in the forward position, the catch element 102 is urged by the cantilever spring 120 to an engaged position with respect to the reel 80 to prevent the reel 80 from winding the cord 44. When the slide member 132 is pulled back against the force of the spring 137, the side wall of the notch 134 engages the pin 114 on the pivot arm 112 and rotates the catch element 102 out of engagement with the reel 80. When the slide member 132 is released, the spring 137 forces the slide member 132 back to its normal position. The catch element 102 is urged back to the engaged position by the cantilever spring 120.

The guide element 140, seen in FIG. 3, has a generally cylindrical body 142 and an L-shaped guide arm 144 extending outwardly from the body 142 of the guide element 140. The function of the guide element 140 is to guide the headset cord 44 as it is wound onto and unwound from the reel 80. The headset cord 44 passes around the cylindrical body 142 of the guide element 140 and through a guide opening 146 in the guide arm 144. The body 142 of the guide element 140 has an axial opening 148. Alignment pins 150 152 fit into each end of the axial opening 148 to hold the guide member in place. Alignment pin 150 is integrally formed with the back cover 24. Alignment pin 152 passes through an opening 56 in the perimeter of the mounting plate 52.

Figure 7:
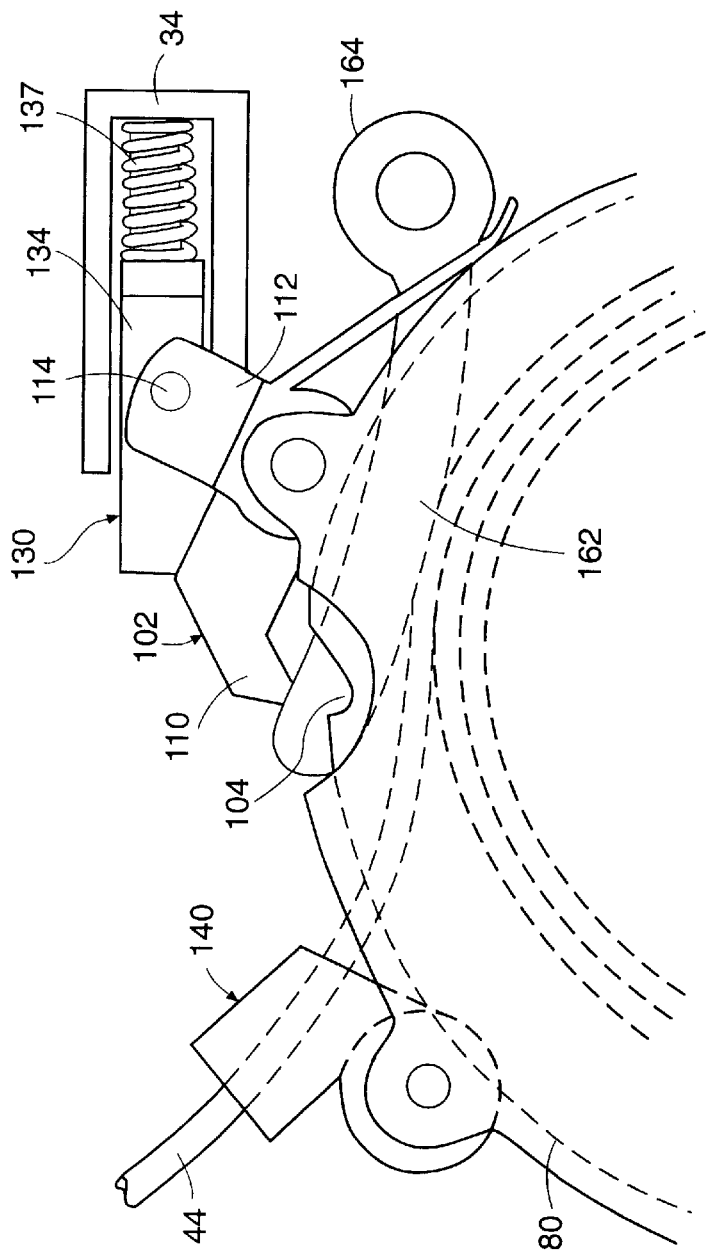
FIG. 7 is a section view of the cord retraction assembly with the cord in an wound state.

The interlock 160, shown in FIGS. 6 and 7, comprises is an elongated, slightly arcuate arm 162 that is pivotally mounted at one end to the housing 20. The arm 162 has a bushing 164 at one end with an axial opening 166. A pivot pin 168 passes through the axial opening 166 in the bushing 164 to hold the arm 162 in place. See FIG. 3. The function of the interlock 160 is to prevent the return of the catch element 102 to an engaged position when the headset cord 44 is wound onto the reel 80 so that the clock spring 90 maintains constant tension on the cord 44.

The free end of the arm 162 engages and rides over the headset cord 44 that is wound onto the reel 80. When the headset cord 44 is wound onto the reel 80, the accumulation of the headset cord 44 on the reel 80 pushes upward on the arm 162, as seen in FIG. 7. As the arm 162 moves upward, the arm 162 engages the catch element 102 and holds the catch element 102 in the disengaged position. When the headset cord 44 is unwound, the spring 120 pushes downward on the catch element 102, which in turn pushes the arm 162 down, as seen in FIG. 6.

In the disclosed embodiment, there is no biasing member for the interlock 160. However, those skilled in the art will recognize that equivalent arrangements can be made where a biasing spring acts on the arm rather than the catch element 102. For example, the arm could be connected to the catch element by a linkage and a spring could be connected to the arm. Also, a separate spring could be used to bias the arm into contact with the cord.

In use, the headset cord 44 is pulled out of the housing 20. As the headset cord 44 is pulled out, the catch element 102 engages the notches 104 on the cord reel 80 to prevent the cord reel 80 from rotating so as to wind the cord 44 onto the reel 80, as seen in FIG. 6. To retract the headset cord 44, the release button 130 is pulled back to disengage the catch element 102 from the cord reel 80. When the catch element 102 is disengaged from the reel 80, the reel 80 rotates freely under the force of the biasing member 90 to wind the headset cord 44 onto the reel 80. As the headset cord 44 winds onto the reel 80, the accumulation of the cord 44 on the reel 80 pushes the arm 162 outward. When approximately one-third of the cord 44 is wound onto the reel 80, the arm 162 prevents the catch element 102 from engaging with the reel 80, as seen in FIG. 7. Thus, constant tension is applied to the headset cord 44 when it is retracted. The constant tension helps to hold the headset 42 in place on the cradle 28.

The present invention may, of course, be carried opt in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A cord retraction assembly with a self-disabling locking mechanism for retracting a cord comprising:
    a) a reel for winding and retracting said cord;
    b) a biasing member for rotating said reel so as to retract and wind said cord onto said reel;
    c) a catch element having a one-way locking mechanism, said catch element movable between engaged and disengaged positions adapted to prevent retraction of said cord in the engaged position and to allow retraction of said cord in the disengaged position; and
    d) an interlock engaged by said cord as the cord is retracted and wound onto said reel and responsive to accumulation of said cord on said reel to hold said catch element in the disengaged position when the cord is retracted, and operative to permit return of the catch element to the engaged position as the cord is unwound from the reel.

2. The cord retraction assembly according to claim 1 further including a biasing member to bias said catch element to an engaged position.

3. The cord retraction assembly according to claim 2 wherein said biasing member is a spring.

4. The cord retraction assembly according to claim 1 wherein said interlock includes an arm that is pivotally mounted at one end and that engages an outer winding of the cord as the cord is wound onto the reel.

5. The cord retraction assembly according to claim 4 wherein said arm engages said catch element in the disengaged position to prevent return of the catch element to the engaged position.

6. The cord retraction assembly according to claim 1 further including a release button to move the catch element to the disengaged position so as to retract the cord.

7. The cord retraction assembly according to claim 6 wherein the release button comprises a slide switch movable between a normal position and a release position.

8. The cord retraction assembly according to claim 7 further including a biasing member to bias the release button to the normal position.

9. The cord retraction assembly according to claim 1 further including a guide element for guiding the cord as the cord is wound onto and unwound from the reel.

10. A portable electronic device with a retractable cord comprising:
    a) a housing having an outlet opening and a headset cradle;
    b) electronic circuitry contained within said housing;
    c) a cord passing through said outlet opening in said housing;
    d) a cord retraction assembly contained within said housing for retracting said cord into said housing, said cord retraction assembly including a cord reel on which said cord is wound;

e) a catch element adapted to engage said cord reel to prevent retraction of said cord, said catch element including a pawl and a biasing member for urging said pawl into engagement with said cord reel; and f) an interlock engaged by said cord as the cord is retracted and wound onto said reel and responsive to accumulation of said cord on said reel to hold said catch element in the disengaged position when the cord is retracted, and operative to permit return of the catch element to the engaged position as the cord is unwound from the reel.

11. The electronic device according to claim 10 further including a biasing member to bias said catch element to an engaged position.

12. The electronic device according to claim 11 wherein said biasing member is a spring.

13. The electronic device according to claim 10 wherein said interlock includes an arm that is pivotally mounted at one end and that engages an outer winding of the cord as the cord is wound onto the reel.

14. The electronic device according to claim 13 wherein said arm engages said catch element in the disengaged position to prevent return of the catch element to the engaged position.

15. The electronic device according to claim 10 further including a release button to move the catch element to the disengaged position so as to retract the cord.

16. The electronic device according to claim 15 wherein the release button comprises a slide switch movable between a normal position and a release position.

17. The electronic device according to claim 16 further including a biasing member to bias the release button to the normal position.

18. The electronic device according to claim 10 further including a guide element for guiding the cord as the cord is wound onto and unwound from the reel.

* * * * *